United States Patent [19]

Howind

[11] Patent Number: 4,630,662
[45] Date of Patent: Dec. 23, 1986

[54] VEHICLE WHEEL WITH TIRE BEAD CLAMPING RING

[75] Inventor: Volker Howind, Wedemark, Fed. Rep. of Germany

[73] Assignee: Continental Gummi-Werke Aktiengesellschaft, Hanover, Fed. Rep. of Germany

[21] Appl. No.: 713,771

[22] Filed: Mar. 19, 1985

[30] Foreign Application Priority Data

Mar. 19, 1984 [DE] Fed. Rep. of Germany ....... 3410048

[51] Int. Cl.⁴ .................... B60B 21/00; B60B 21/10
[52] U.S. Cl. .................... 152/397; 152/398; 152/380; 152/DIG. 20
[58] Field of Search .............. 152/397, 398, 379.5, 152/380, 404, DIG. 20; 301/97, 98

[56] References Cited

U.S. PATENT DOCUMENTS

| | | | |
|---|---|---|---|
| 994,247 | 6/1911 | Cole | 152/398 X |
| 1,932,191 | 10/1933 | Shoemaker | 152/397 |
| 4,168,732 | 9/1979 | Monzini | 152/398 X |
| 4,563,042 | 1/1986 | Seitz et al. | 152/380 X |

FOREIGN PATENT DOCUMENTS

| | | | |
|---|---|---|---|
| 1164257 | 2/1964 | Fed. Rep. of Germany | 152/404 |
| 2030086 | 4/1980 | United Kingdom | 152/380 |
| 2078638 | 1/1982 | United Kingdom | 301/98 |

Primary Examiner—David A. Scherbel
Attorney, Agent, or Firm—Becker & Becker, Inc.

[57] ABSTRACT

A vehicle wheel, especially for a truck. The wheel has a rigid rim on which can be mounted a pneumatic tire of rubber or rubber-like material. The carcass of the tire is anchored in the tire beads by being looped around pull-resistant bead cores. The tire beads are disposed on the radially inner periphery of the rim ring. In order to make it particularly easy to mount the tire, the rim seating surfaces for each tire bead extend essentially horizontally in the transverse direction, and extend to the edge of the rim ring. A clamping ring is disposed radially inwardly of the tire bead, with that side of the clamping ring which rests against the bead extending at an angle to the axis of rotation of the wheel. The bead core has a cross-sectional shape which includes sides which extend essentially parallel to the clamping ring and parallel to the rim seating surface.

10 Claims, 4 Drawing Figures

VEHICLE WHEEL WITH TIRE BEAD CLAMPING RING

BACKGROUND OF THE INVENTION

1. Field of the Invention

The present invention relates to a vehicle wheel, especially for trucks, having a rigid rim on which can be mounted a pneumatic tire of rubber or rubber-like material; the carcass of the tire is anchored in the tire beads by being looped around pull-resistant bead cores, and the beads are disposed on the radially inner periphery of the rim ring.

2. Description of the Prior Art

A vehicle wheel of this general type, which up to now has been provided predominantly for automobiles, is disclosed in U.S. Pat. No. 4,408,647 Kuhn et al dated Oct. 11, 1983, which belongs to the Assignee of the present invention. A deep bed or recessed mounting portion is provided with this heretofore known vehicle wheel for mounting the tire. A circumferential section of one of the tire beads is pressed into this deep bed so that the tire bead on the other side can be lifted over the rim flange.

With vehicle wheels for trucks, which are subjected to considerably greater loads, very stiff bead cores of steel cables having large core cross-sections are customarily utilized in the tires; these bead cores only permit a manual deformation to a very slight extent. Thus, with a wheel of the aforementioned type, such a truck tire could at best be mounted only with great difficulty without mechanical assistance.

An object of the present invention therefore is to provide a vehicle wheel which is suitable for use on trucks and other heavy vehicles, and according to which the tire can be mounted in a very simple manner, the tire is mounted on the radially inner side of the rim ring to achieve the good driving behavior known with the wheel of U.S. Pat. No. 4,408,647 Kuhn et al dated Oct. 11, 1983, and the tire wall leaves the rim at a very flat angle.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The vehicle wheel of the present invention is characterized primarily in that the rim seating surfaces for each of the tire beads extends essentially horizontally, i.e. axially or parallel to the axis of rotation of the wheel, in the transverse direction, and extends to the edge of the rim ring, in that a clamping ring is disposed radially inwardly of each tire bead, with that side of the clamping ring which rests against the tire bead extending at an angle to the axis of rotation of the wheel, and in that each bead core has a cross-sectional shape which includes sides which extend essentially parallel to the clamping ring and parallel to the rim seating surface.

With the present invention, due to the elimination of the customary rim flange, it is possible without any difficulty to place the bead of the tire onto the seating surfaces provided on the rim. By simply tightening the clamping rings, the beads are fixed in position. It might also be possible to hold the clamping rings with the aid of a spring or snap ring, because the bead pulls itself into a sealing position on its own due to the pressure within the tire.

Pursuant to one advantageous embodiment of the present invention, the clamping ring is tightly screwed to such an extent that even when the tire is not inflated, a pretensioning at the tire beads is produced which results in a tensile load of the tire beads if the diameter of the rim seating surfaces are sufficiently great. This prestressing, in conjunction with the force components which are created due to the inner pressure of the tire, reliably insure that the bead core is never pressure loaded during driving operation. The tensile loading, on the other hand, which is the only stress which occurs, is harmless for the bead core, in contrast to a pressure loading for compression.

In addition to good driving and riding properties during normal operation, the inventive vehicle wheel also has excellent emergency operation properties; i.e. it can still be driven a considerable distance in the event of a blow-out or flat tire without having the tire suffer permanent damage. These good emergency operation properties are primarily achieved in that the tire, during a loss of pressure, can bulge laterally outwardly and can have its zenith portion supported on support surfaces of the rim. Furthermore, in the event of prestressed bead cores, high traction forces can still be transmitted, even when the tire contains no air.

DESCRIPTION OF PREFERRED EMBODIMENTS

Figure 1:
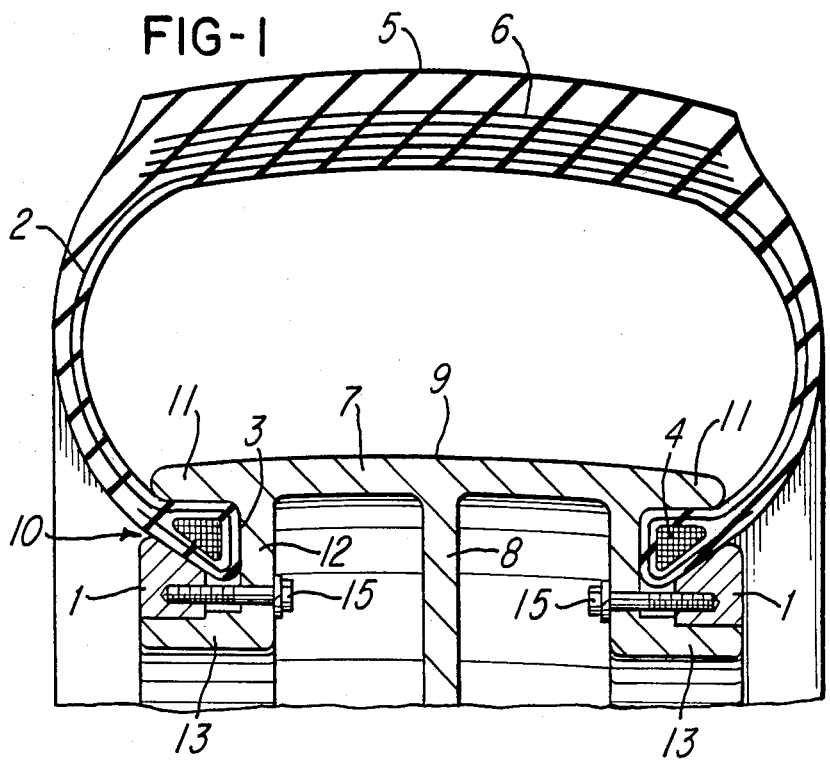
FIG. 1 is a view showing a partial radial section of a first inventive embodiment of a rim of a vehicle wheel for trucks.

Referring now to the drawings in detail, the vehicle wheel illustrated in FIG. 1 comprises a one-piece rigid rim with two retaining or clamping rings 1 screwed to it; mounted on the rim is a tire which predominantly comprises rubber or rubber-like material. A radial carcass 2 of preferably metallic load-carrying cords is anchored in the beads 3 by being looped around pull-resistant bead cores 4; the carcass 2 could also be a diagonal or bias carcass. Disposed between the treat 5 and the carcass 2 is a multi-ply belt 6.

The rim ring 7, which in cross-section has a slightly convex contour, is fixedly connected to a wheel-center disk 8. The convex outer surface of the rim ring 7 serves as a support surface 9 for the zenith portion of the tire during an emergency operation. If necessary, the central portion of the support surface 9 can have an increased diameter. Disposed axially outwardly on each side of the rim ring 7 is a respective recess 10, which has an approximately rectangular cross-section. Each recess 10 is delimited on three sides by a radially outwardly disposed portion 11 of the rim ring 7, a vertically or radially extending rim part 12, and a radially inner, annular rim part 13 which essentially extends horizontally, i.e. axially. The radially inner surface of the outer rim ring part 11, which when viewed in cross-section also extends approximately horizontally or axially, serves as the seating surface 14 for the tire bead 3, which has an approximately triangular cross-section. The slope of the seating surfaces 14 should be within a range of 0° to 15°.

The tire bead 3 is held in the operating position by the clamping ring 1. The clamping ring 1 rests against the rim part 13, and is screwed to the vertically extending rim part 12 (see FIG. 1 and the enlarged detailed view of FIG. 2). If necessary, the screws 15 can also be guided from the outside through the clamping ring 1, as is the case, for example, in the embodiment of FIG. 4. An abutment or stop 16 ensures that the clamping ring 1 does not press or squeeze the tire bead 3 too greatly.

The bead core 4, just like the entire tire bead 3, preferably has a cross-section in the form of a right triangle, with the corners being rounded off. For an optimum clamping of the tire bead 3, an important feature comprises having that surface of the bead core 4 which faces the clamping ring 1 (the hypotenuse of the cross-sectional triangle) extending parallel to that surface of the clamping ring which rests against the tire bead 3, and also having that surface of the bead core 4 which faces the outer rim ring part 11 extending parallel to the seating surface 14 for the tire bead 3.

A particularly high load-carrying capability for the tire results if, due to the relatively strong screw connection of the clamping ring 1, there is produced, even when the tire is not inflated, a force component on the tire bead 3, and hence on the bead core 4, which is directed approximately diagonally radially outwardly and axially inwardly, and which results in a tensile load on the bead core 4. However, when producing these force components, attention should be paid to having the diameter of the rim seating surfaces 14 great enough that after the clamping ring 1 is tightened, a force which is equal from all sides does not press against the tire bead 3. After the tire is inflated, there occurs a further tensile loading of the tire bead 3, and hence of the bead core 4, in the direction of the tire wall, i.e. predominantly axially outwardly, and slightly radially outwardly. Without the aforementioned artificially produced force components, driving situations are conceivable, such as a substantial inward deflection, where the tension on the bead core 4 also has a radially inwardly directed components, which results in an undesirable compression and bulging of the bead core 4. However, the artificially produced additional force components reliably prevent harmful consequences of such radially inwardly directed components by overcompensation.

Figures 2, 3:
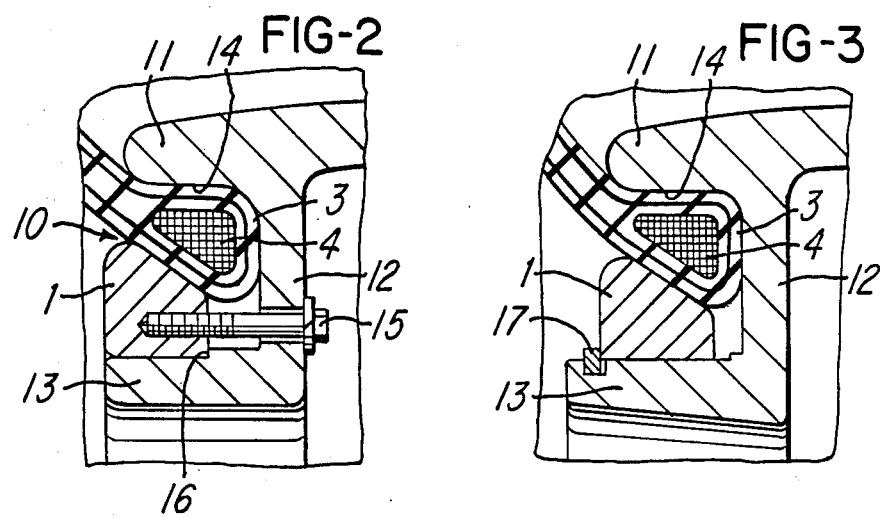
FIG. 2 is an enlarged detailed view of the vehicle wheel of FIG. 1 in the axially outer region of the rim ring.
FIG. 3 is a view showing a partial radial section of another inventive embodiment of a vehicle wheel having a clamping ring which is held by a spring ring.

The vehicle wheel of FIG. 3 differs from that of FIG. 2 in that the clamping ring 1 is held against the tire bead with the aid of a spring or snap ring 17. In all other respects, the structural features of the rim and tire correspond to those described in connection with the previous embodiment.

Figure 4:
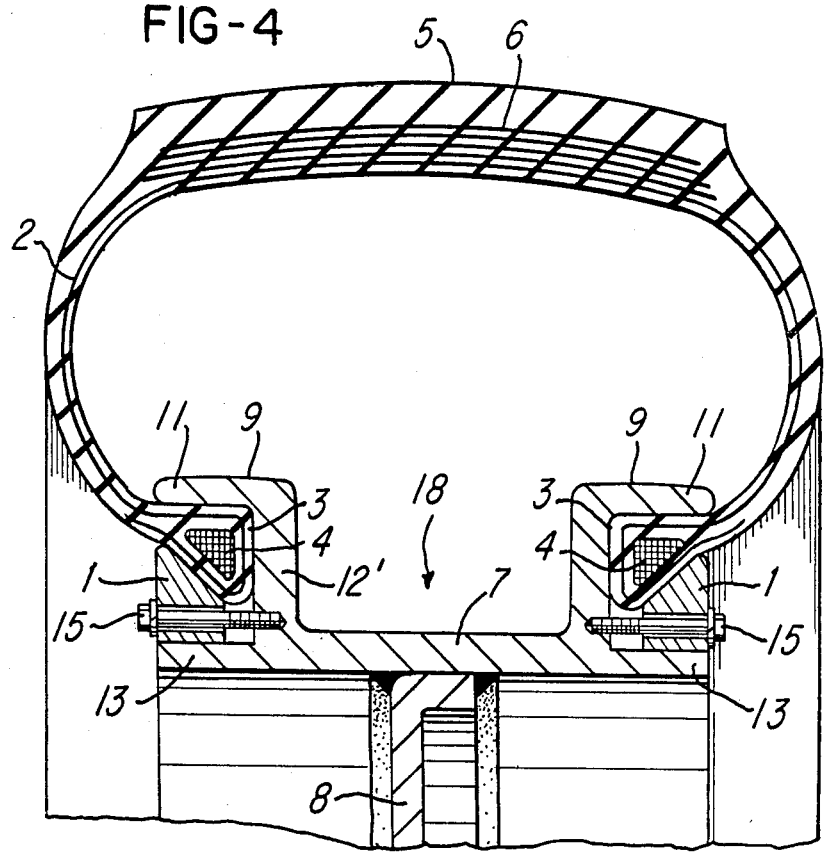
FIG. 4 is a view showing a partial radial section of a further inventive embodiment of a rim of a vehicle wheel for a truck.

The vehicle wheel of FIG. 4 differs from that of the embodiment of FIG. 1 in that it has a different rim construction, while the tire remains the same. The rim is provided radially outwardly with smaller support surfaces 9, and also has a conventional drop center 18. The side walls 12' of the drop center simultaneously serve as delimiting walls for the respective recesses 10, and receive the screws 15 for mounting the clamping rings 1. In all other respects, the structural features correspond to those described in connection with the embodiment of FIG. 1.

It should be noted that it is possible to mount the tire on a one-piece rim as shown in FIG. 1 pursuant to a method practiced by the assignee of the present application. Pursuant to this method, the rim is first moved toward the tire at right angles thereto until it is disposed within the tire; subsequently, by rotating the tire or the rim, the axes of rotation of the tire and rim are aligned parallel to one another.

The present invention is, of course, in no way restricted to the specific disclosure of the specification and drawings, but also encompasses any modifications within the scope of the appended claims.

What I claim is:

1. A vehicle wheel, especialy for trucks and other heavy vehicles as well as being suitable for so-called emergency running operation, having an axis of rotation and a rigid rim on which can be mounted a pneumatic tire of rubber or rubber-like material including tire beads drawn spontaneously into a sealing position during inflating of the tire as well as being also automatically centered thereby relative to said rim as dual effects attained therewith; the carcass of the tire is anchored in the tire beads by being looped around pull-resistant bead cores, and the tire beads are disposed on the radially inner periphery of the rim ring; said wheel comprises:

a central rim ring portion, to both sides of which extend respective axially outer rim ring parts, each of said rim ring parts forming a seating surface for a tire bead, each of said seating surfaces extending essentially parallel to said axis of rotation of said wheel;

a respective clamping ring disposed radially inwardly of each of said tire beads, said clamping ring having a side including a surface which rests at an acute angle against its tire bead, said side surface extending at an acute angle to said axis of rotation of said wheel; each of said bead cores having a cross-sectional shape which includes a side which is essentially parallel to said side surface of said clamping ring, and a side which is essentially parallel to said seating surface for its bead.

2. A vehicle wheel according to claim 1, in which a respective radially extending rim ring part is provided to both sides of said central rim ring portion, and extends radially inwardly from a given one of said axially outer rim ring parts; and in which an axially inner portion of each of said tire beads rests against one of said radially extending rim ring parts.

3. A vehicle wheel according to claim 1, in which the radially outer surface of at least said central rim ring portion is in the form of a support surface for said tire during an emergency operation.

4. A vehicle wheel according to claim 1, in which the radially outer surfaces of said axially outer rim ring parts are in the form of support surfaces for said tire during an emergency operation.

5. A vehicle wheel according to claim 1, in which each side of said rim ring is provided on the axially outer side with a recess which is delimited on three sides, namely by said axially outer rim ring part, which extends approximately parallel to said axis of rotation of said wheel, by a radially extending rim ring part which extends radially inwardly from said axially outer rim ring part, and by an annular further rim ring part which extends axially outwardly from said radially extending rim ring part and extends essentially parallel to said axis of rotation of said wheel; said annular further rim ring part is disposed radially inwardly of said axially outer rim ring part.

6. A vehicle wheel, especially for trucks, having an axis of rotation and a rigid rim on which can be mounted a pneumatic tire of rubber or rubber-like material; the carcass of the tire is anchored in the tire beads by being looped around pull-resistant bead cores, and the tire beads are disposed on the radially inner periphery of the rim ring; said wheel comprising:
- a central rim ring portion, to both sides of which extend respective axially outer rim ring parts, each of which forms a seating surface for a tire bead, with each of said seating surfaces extending essentially parallel to said axis of rotation of said wheel;
- a respective clamping ring disposed radially inwardly of each of said tire beads, said clamping ring having a side which rests against its tire bead, with said last-mentioned side extending at an angle to said axis of rotation of said wheel; each of said bead cores having a cross-sectional shape which includes a side which is essentially parallel to said clamping ring, and a side which is essentially parallel to said seating surface for its bead; a respective radially extending rim ring part provided to both sides of said central rim ring portion, and extending radially inwardly from a given one of said axially outer rim ring parts; and
- an axially inner portion of each of said tire beads resting against one of said radially extending rim ring parts; each of said clamping rings being screwed to one of said radially extending rim ring parts with such a tightness that even when said tire is not inflated, said clamping ring exerts on its tire bead a prestress which is directed approximately diagonally radially outwardly and axially inwardly.

7. A vehicle wheel, especially for trucks, having an axis of rotation and a rigid rim on which can be mounted a pneumatic tire of rubber or rubber-like material; the carcass of the tire is anchored in the tire beads by being looped around pull-resistant bead cores, and the tire beads are disposed on the radially inner periphery of the rim ring; said wheel comprising:
- a central rim ring portion, to both sides of which extend respective axially outer rim ring parts, each of which forms a seating surface for a tire bead, with each of said seating surfaces extending essentially parallel to said axis of rotation of said wheel;
- a respective clamping ring disposed radially inwardly of each of said tire beads, said clamping ring having a side which rests against its tire bead, with said last-mentioned side extending at an angle to said axis of rotation of said wheel; each of said bead cores having a cross-sectional shape which includes a side which is essentially parallel to said clamping ring, and a side which is essentially parallel to said seating surface for its bead; a respective radially extending rim ring part provided to both sides of said control rim ring portion, and extending radially inwardly from a given one of said axially outer rim ring parts; and
- an axially inner portion of each of said tire beads resting against one of said radially extending rim ring parts; said vehicle wheel being provided on each side, for receiving a tire bead and a clamping ring, with a respective recess which is delimited on three sides, namely by said axially outer rim ring part, by said radially extending rim ring part, and by an annular further rim ring part which extends axially outwardly from said radially extending rim ring part and extends essentially parallel to said axis of rotation of said wheel; said annular further rim ring part being disposed radially inwardly of said axially outer rim ring part.

8. A vehicle wheel according to claim 7, in which a portion of each of said clamping rings rests against one of said annular further rim ring part.

9. A vehicle wheel according to claim 8, in which each of said annular further rim ring parts is provided with a safety abutment for one of said clamping rings.

10. A vehicle wheel according to claim 8, in which that surface of each of said annular further rim ring parts on which one of said clamping rings rests is provided with an annular groove in which is disposed a spring ring for securely holding said clamping ring in place.

* * * * *